United States Patent [19]
Bierlein et al.

[11] 3,985,408
[45] Oct. 12, 1976

[54] BEARING HAVING IRON SULFUR MATRIX

[75] Inventors: John C. Bierlein, Royal Oak;
Edward J. Shipek, Sterling Heights, both of Mich.

[73] Assignee: General Motors Corporation, Detroit, Mich.

[22] Filed: Oct. 10, 1975

[21] Appl. No.: 621,495

[52] U.S. Cl. ............................ 308/237 R; 29/182.3; 75/125; 308/DIG. 8
[51] Int. Cl.² .................................... F16C 27/00
[58] Field of Search............ 29/182.1, 182.2, 182.3, 29/149.5 S, 149.5 P; 75/123 R, 123 CB, 123 G, 125, 201; 308/23, 237 R, 241, DIG. 8

[56] References Cited
UNITED STATES PATENTS

| | | | |
|---|---|---|---|
| 2,799,080 | 7/1957 | Duckworth et al. | 29/182.3 |
| 2,855,296 | 10/1958 | Kochring | 29/182.3 |
| 3,425,112 | 2/1969 | Roemer | 308/237 R X |
| 3,667,823 | 6/1972 | Webbere | 308/237 R |

*Primary Examiner*—M. H. Wood, Jr.
*Assistant Examiner*—Gene A. Church
*Attorney, Agent, or Firm*—Peter P. Kozak

[57] ABSTRACT

A bearing comprising a steel backing with a porous matrix composition comprising ½ to 6 percent by weight sulfur, 0 to 60 percent copper, and the balance iron which is impregnated with babbitt.

5 Claims, 4 Drawing Figures

BEARING HAVING IRON SULFUR MATRIX

FIELD OF THE INVENTION

This invention relates to bearings of the type which have a bearing layer comprising a porous matrix of relatively hard metal or alloy in which is dispersed lead or a lead alloy.

DESCRIPTION OF THE PRIOR ART

A bearing structure in present day wide-spread use is manufactured by sintering a powder consisting of by weight, 85 percent copper and 15 percent nickel onto a SAE 1008 steel backing plate to form a porous matrix and casting a high lead base babbitt consisting of by weight, 4 percent tin, 3.5 percent antimony, and the balance lead onto the copper-nickel matrix and held to a thickness of 0.005 inch or less. The disadvantage of this bearing resides in the high cost of nickel and copper as well as only fair score resistance when the babbitt overlay has worn away and the journal is exposed to the matrix.

Another prior art bearing material is disclosed in the U.S. Pat. No. 2,799,080 which consists of an iron matrix in which is dispersed lead in a proportion of 10 to 50 percent by weight and a sulfide of a metal selected from the group consisting of iron, lead, copper and tin in the proportion of 0.5 to 10 percent by weight.

SUMMARY OF THE INVENTION

In accordance with this invention, a matrix material is formed by sintering a powdered mixture of about ½ to 6 percent by weight sulfur, and the balance iron. Optionally up to 60 percent of the iron may be replaced by copper to permit a reduction of the sintering temperature of the mixture. The sulfur is added directly to the iron powder so that after sintering the sulfur forms a part of the matrix and is operative to provide the iron with score resistance.

In the preferred form, the invention comprises a steel backing to which is bonded the relatively hard porous matrix with the lead or lead alloy being impregnated in the matrix. The lead or lead alloy may also be present as an overlay over the matrix. A good application for this bearing is an automotive engine journal bearing. The invention may also be embodied in the form of simple bushings or half bushings with the bushings consisting of the babbitt impregnated matrix material with or without a babbitt overlay.

BRIEF DESCRIPTION OF THE DRAWINGS

The details of the invention are disclosed in the following description made in connection with the accompanying drawings in which.

DESCRIPTION OF THE PREFERRED EMBODIMENT

Figure 1:
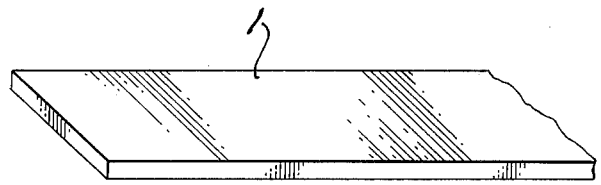
FIG. 1 is a steel backing strip.

The present invention consists basically in using a matrix which consists essentially of iron alloyed with sulfur made by sintering a powdered mixture of iron and iron sulfide or other suitable sulfide such as tin sulfide or copper sulfide or elemental sulfur. Good score resistance is obtained with the sulfur content of the iron matrix being in the range of about ½ to 6 percent by weight.

EXAMPLE 1

A bearing structure in accordance with the preferred embodiment of this invention was made by first providing a steel plate as for example of SAE 1008 steel, 0.051 inch thick. The steel sheet was cleaned in acetone and rubbed with emery cloth. A powdered mixture was prepared consisting of iron and iron sulfide having a mesh size of minus 120, plus 140 in proportion such as to contain a calculated 1 percent by weight sulfur and the balance iron. A layer of the mixture about 0.022 inch thick was applied over the steel plate by means of a trowel. The composite was then inserted into an induction furnace. The furnace was vacuum purged to 12 microns two times and filled with argon. The furnace was then heated at 2330° F. for 4 minutes to sinter the powdered layer and bond the resulting porous matrix to the backing plate and permitted to cool. The final matrix composition was analyzed at 0.8 percent sulfur and the balance iron.

Next, a particulate babbitt consisting of 3.5 percent by weight antimony, 4 percent tin and the balance lead was sprinkled over the matrix, together with an additional 4 percent tin (4 percent of the babbitt weight) and with a zinc chloride flux. This assembly was placed in the induction furnace and heated to 680° F. for a time sufficient to melt and flow the babbitt over the matrix and to impregnate the pores of the matrix and to provide an overlay of babbitt up to about 0.005 inch.

The bearing structure was tested by means of the score test machine described in the paper "Scoring Characteristics of Thirty-Eight Elemental Metals in High Speed Sliding Contact with Steel", by A. E. Roach, C. L. Goodzeit, and R. P. Hunnicutt, American Society of Mechanical Engineers, Paper No. 54-A-61, November, 1954.

Briefly, the test uses a small flat slider as a test sample of the material to be tested which is loaded against a rotating steel disc with an entrant angle of ½° and with a kerosene lubricant therebetween. When running the test the load is gradually increased in accordance with a straight line relationship from zero to 1500 pounds over a period of 6 minutes with a sliding velocity of about 725 inches per second. The disc surface roughness is carefully established at a roughness of about 6 microinches. It is important that the disc be neither too rough nor too smooth so that the score resistance properties of different materials may be readily distinguished or separated from one another. A roughness of about 6 microinches has been found effective. A test material which can satisfactorily carry a full load in this roughness area is considered a successful material for resistance to scoring.

A test material is considered to satisfactorily carry the load during the test if (1) no welding or seizure occurs; (2) if the friction torque between the disc and the sample does not exceed a predetermined value (about 30 pound-inches); and (3) if the temperature of the back side of the test sample does not rise above a predetermined value (about 250° F.).

The sample described above was then machined to remove the babbitt overlay. It was subjected to the above described test using a disc roughness of 5.8 microinches and found to have satisfactory score resistance. The overlay was removed so that the score resistance test was performed on the impregnated matrix and not on the overlay.

EXAMPLE 2

A matrix was formed on a steel plate by a procedure similar to that described in Example 1 wherein the matrix composition was varied by adding copper powder to the initial mixture to produce a calculated composition of 30 percent by weight copper, 3 percent sulfur, and the balance iron. The composition was sintered in an argon atmosphere for 3 minutes at 2150° F. and sulfur content was about 2.6 percent. The same babbitt as in Example 1 + 4 percent tin was applied to the matrix and machined for testing as in Example 1 and the bearing structure was tested for score resistance and gave satisfactory results using a disc roughness of 6.5 microinches.

EXAMPLE 3

A matrix was formed on a steel plate by a procedure similar to that described in Example 1 wherein the matrix composition was varied by adding copper powder to the initial mixture to produce a calculated initial composition of 50 percent copper, 3 percent sulfur, and the balance iron and wherein the preoxidation sintering technique was used. The mixture was heated initially in an atmosphere consisting of 25 percent air and the balance argon to partially oxidize the iron. When a temperature of 2050° F. was reached the oxygen was purged with argon and the mixture was heated for seven minutes in an argon atmosphere to provide a sintered matrix about 0.013 inch thick having a sulfur content of about 2.6 percent. The oxidation step enhanced the sintering. The matrix was impregnated as in Example 1 with a babbitt consisting of 4 percent by weight tin, 3.5 percent antimony and the balance lead with an additional 4 percent tin, 4 percent of the weight of the babbitt. The bearing structure was machined for testing as in Example 1 and tested for score resistance and gave satisfactory results using a disc roughness of 5.7 microinches.

EXAMPLE 4

A matrix was formed by a procedure similar to that described in Example 1 wherein the initial calculated composition was 4 percent sulfur and the balance iron. The powdered layer was sintered in an argon atmosphere at about 2300° F. for 4 minutes to form a matrix layer about 0.032 inch thick with a final sulfur content analyzed to be 2.9 percent. The porous matrix was impregnated with a babbitt consisting of 4 percent tin, 3.5 percent antimony and the balance lead plus an additional 4 percent tin, 4 percent of the weight of the babbitt and machined for testing in the manner described in Example 1. The bearing structure was tested for score resistance and gave satisfactory results using a disc roughness of 6.5 microinches.

EXAMPLE 5

A matrix was formed by a procedure similar to that described in Example 3 wherein an initial calculated powdered matrix composition of 30 percent copper, 4 percent sulfur and the balance iron was heated in an oxidizing atmosphere to 2050° F. and then sintered at this temperature in an argon atmosphere for 7 minutes to form a matrix layer about 0.016 inches thick having a sulfur content estimated at 3.0 percent. The sintered matrix was impregnated with a babbitt consisting of 4 percent tin, 3.5 percent antimony and the balance lead + 4 percent tin − 4 percent of the weight of the babbitt and machined for testing as described in Example 1. The matrix was tested for score resistance and gave satisfactory results using a disc roughness of 6.1 microinches.

EXAMPLE 6

A matrix was formed by a procedure similar to that described in Example 3 wherein an initial calculated powdered composition of 4 percent sulfur, 50 percent copper and the balance iron was heated in an oxidizing atmosphere to about 2050° F. and then sintered at this temperature in an argon atmosphere for 7 minutes to form a matrix layer about 0.012 inches thick having a sulfur content of 3.0 percent. The sintered matrix was impregnated with babbitt consisting of 4 percent tin + 3.5 percent antimony and the balance lead + an additional 4 percent tin, 4 percent of the weight of the babbitt and machined for testing as described in Example 1. The matrix was tested for score resistance and gave satisfactory results using a disc roughness of 6.0 microinches.

EXAMPLE 7

A matrix was formed by a procedure similar to that described in Example 3 wherein an initial calculated powdered composition 60 percent copper and 4 percent sulfur was initially heated to 1935° F. in a controlled oxidizing atmosphere and then sintered in argon for 7 minutes to produce a matrix about 0.014 inches thick having a sulfur content estimated at 3.0 percent. The sintered matrix was impregnated with a babbitt + tin as in Example 6 and machined for testing. The matrix tested satisfactorily for score resistance with a disc roughness of 5.7 microinches.

EXAMPLE 8

A matrix was formed by a procedure similar to that described in Example 3 wherein an initial calculated powdered composition 60 percent copper and 5 percent sulfur was initially heated to 1935° F. in a controlled oxidizing atmosphere and then sintered in argon for 7 minutes to produce a matrix about 0.016 inch thick. The matrix was impregnated with a babbitt consisting of 4 percent tin, 3.5 percent antimony and the balance lead + an additional 4 percent tin, 4 percent of the weight of the babbitt as in Example 6 and machined for testing. The matrix tested satisfactorily for score resistance with a disc roughness of 6.1 microinches.

The iron-sulfur matrix of this invention has markedly superior score resistance in the neighborhood of a threefold improvement to the commercial nickel-copper matrix described above and is considerably more economical. It has comparable fatigue resistance. This matrix likewise has a similar threefold improvement in score resistance over the matrix disclosed in the above mentioned patent.

The success of the matrix of this invention is in the addition of sulfur to the iron. The sulfur is preferably added as iron sulfide as in the above examples but may also be added in other forms such as tin or copper sulfide and elemental sulfur. Accordingly, substantially the same matrix performance is obtainable with the presence of small quantities of tin and substantial quantities of copper as indicated in the examples.

Satisfactory matrix structures are obtained with a sulfur content in the matrix ranging from about ½ to 6 percent by weight. A sulfur content below ½ percent produces a matrix with inadequate score resistance. A sulfur content above 6 percent by weight produces severe processing problems. It is generally preferred to maintain the final sulfur content between 1 and 3 percent as shown in the examples. Copper may be included in the matrix up to 60 percent by weight with satisfactory score resistance as shown in Examples 1 and 4 a copperless matrix is equally satisfactory but requires a sintering temperature in the range of 2300° to 2350° F. The substitution of copper for the iron in the matrix reduces the sintering temperature more or less in proportion to the copper content. For example, in Example 5 a 30 percent copper content includes a sintering temperature of 2050° F. and a 60 percent copper content in Examples 7 and 8 involve a sintering temperature of 1935° F. Accordingly, the amount of copper to be used to a significant extent may be determined by the relative cost of energy in comparison with the cost advantage of iron over copper. In general, temperatures below 2300° F. cannot be used to sinter iron-sulfur matrix mixtures because of inadequate diffusion. However, sintering temperatures down to 2050° F. may be used for matrix compositions containing about 30 percent copper. At the 50 percent copper level sintering temperatures in the range of 1935° to 1985° F. may be used and at the 60 percent copper level temperatures down to 1900° F. may successfully be used.

The size of the powders, sintering time, and sintering temperatures should be such that a matrix is formed so that after impregnating the matrix with babbitt between about ¼ to about ⅔ of composite surface is the matrix material with remainder being babbitt. Of the ⅓ to ¾ babbitt in the composite, it is preferable that ½ to ⅔ of the composite surface be the babbitt. As above indicated, the porosity of the matrix is a function of particle size and sintering time and temperature as is known to those skilled in the art. Although as described in Example 1, the bearing is initially provided with a babbitt overlay up to 0.005 inch, the overlay could quickly wear away in service so that journal runs against the relatively hard matrix material.

A journal bearing as shown in the drawing is readily made in accordance with the examples.

Figure 2:
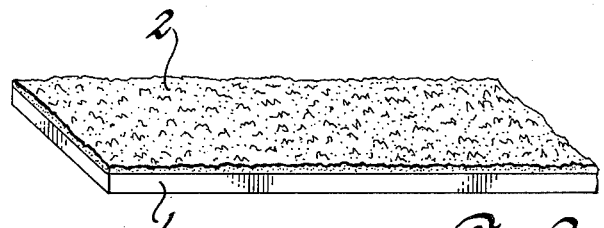
FIG. 2 is the strip of FIG. 1 with sintered powdered mixture of iron and sulfur bonded to the steel to form a porous matrix.
Figure 3:
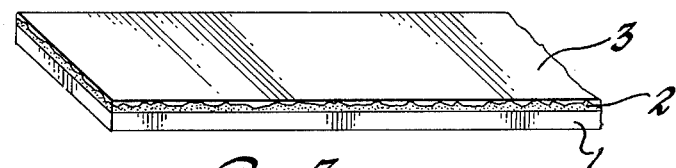
FIG. 3 is a view of the strip after the application of a babbitt to the matrix.
Figure 4:
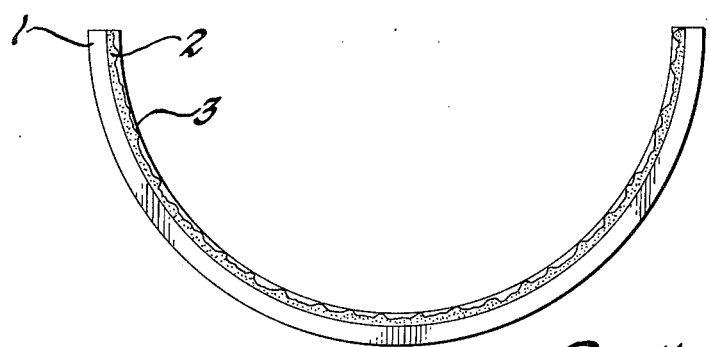
FIG. 4 is an end elevation of a bearing formed from the strip of FIG. 3.

A flat steel sheet 1 of, for example, SAE 1008 steel as shown in FIG. 1 is cleaned and a uniform layer 2 as shown in FIG. 2 of, for example, a mixture of iron and iron sulfide of suitable mesh size is applied to the sheet 1. This assembly is then placed in an induction furnace in an argon atmosphere and sintered at about 2300° F. for about 6 minutes. The babbitt 3 is cast over the matrix as described in Example 1 and finally the composite sheet of FIG. 3 is stamped or otherwise formed to the semi-circular shape of FIG. 4.

As described in the Examples 3 and 8, preoxidation in the sintering step may be employed to enhance the sintering process. The sintering step per se may be performed under a reducing atmosphere to further enhance the sintering.

By the term babbitt as used herein is meant a lead or tin base bearing alloy. A tin base alloy may include tin as the principle constituent and lead, antimony, copper and arsenic. A lead base alloy may include lead as the principle constituent and tin, antimony, copper and arsenic.

While the invention has been described in terms of specific embodiments, other forms may be adopted within the scope of the invention.

What is claimed is:

1. A bearing comprising:
    a steel backing,
    a porous metal matrix bonded to said backing,
    said matrix consisting essentially by weight of about ½ to 6 percent sulfur, 0 to 60 percent copper and the balance iron, and
    a babbitt overlay filling at least the surface pores of said matrix.

2. A bearing comprising:
    a porous metal matrix, said matrix consisting essentially by weight of about ½ to 6 percent sulfur, 0 to 60 percent copper and the balance iron, and
    a babbitt overlay filling at least the surface pores of said matrix.

3. The bearing of claim 2 in which the surface pores consist of about ½ to ⅔ of surface to said matrix.

4. A method for making a bearing which comprises the steps of:
    depositing onto a steel substrate a powder mixture of iron and a material taken from the group consisting of iron sulfide, copper sulfide, tin sulfide and sulfur,
    sintering said mixture whereby a porous matrix is formed which is bonded to said substrate and filling the pores of said matrix with babbitt.

5. A bearing comprising:
    a porous metal matrix, said matrix consisting essentially of a sintered layer of a powdered mixture, said mixture consisting essentially of ½ to 6 percent sulfur, 0 to 60 percent copper and the balance iron, and
    a babbitt overlay filling at least the surface pores of said matrix.

* * * * *